Figure 1:
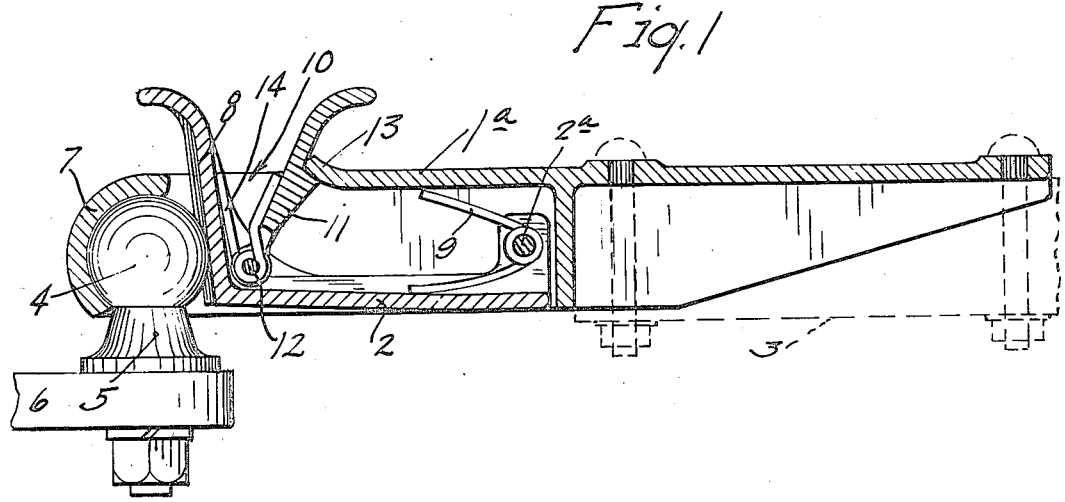

M. D. & A. L. BRICE.
POLE COUPLING.
APPLICATION FILED MAY 22, 1916.

1,254,199.

Patented Jan. 22, 1918.

WITNESSES
E. C. Wells
H. L. Opsahl.

INVENTORS
M. D. BRICE
A. L. BRICE
BY THEIR ATTORNEYS

UNITED STATES PATENT OFFICE.

MILTON D. BRICE AND ALFRED L. BRICE, OF MINNEAPOLIS, MINNESOTA.

POLE-COUPLING.

1,254,199.　　　　　　　Specification of Letters Patent.　　Patented Jan. 22, 1918.

Application filed May 22, 1916. Serial No. 99,134.

*To all whom it may concern:*

Be it known that we, MILTON D. BRICE and ALFRED L. BRICE, citizens of the United States, residing at Minneapolis, in the county of Hennepin and State of Minnesota, have invented certain new and useful Improvements in Pole-Couplings; and we do hereby declare the following to be a full, clear, and exact description of the invention, such as will enable others skilled in the art to which it appertains to make and use the same.

Our present invention relates to couplers adapted for use to connect poles of trailer carts to the rear portion of automobiles, and is in the nature of an improvement on the coupler disclosed and broadly claimed in our Patent No. 1,147,844, of date, July 27, 1915, and entitled "Pole coupler."

The present invention provides a positive lock for the so-called ball clamping dog, whereby the latter is positively prevented from being accidentally jarred or thrown from the position in which it holds the ball or head of the coupler interlocked to the socket member thereof.

In the accompanying drawings which illustrate the invention, like characters indicate like parts throughout the several views.

Figure 2:
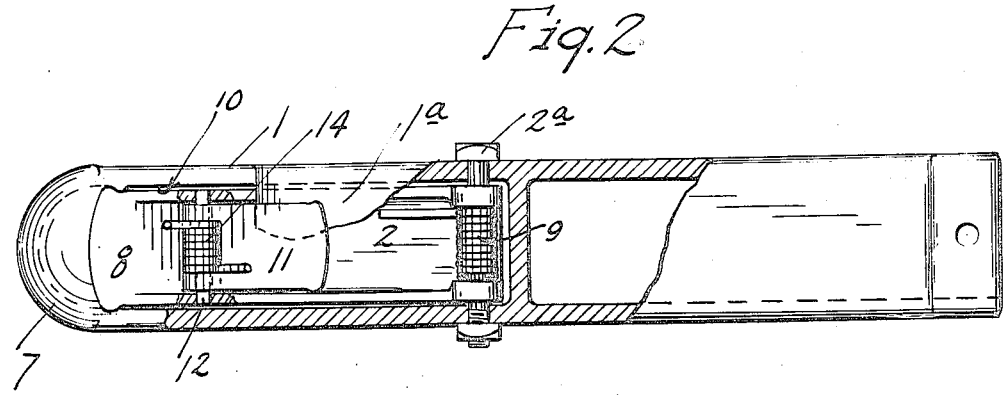

Referring to the drawings:

Figure 1 is a vertical section of the improved coupler, some parts being shown in full and some parts being broken away; and Fig. 2 is a plan view of the same with some parts broken away and some parts sectioned.

The coupler comprises a ball and socket member. The socket member is made up of two parts, to-wit, a U-shaped body member 1 and a ball clamping dog 2, which latter is pivoted to the former, preferably by a nut-equipped bolt $2^a$. In the arrangement shown, the prongs of the U-shaped socket member 1 are rigidly bolted to the front end of a pole 3 of the trailer cart, and the ball member 4 has a vertically depending stem 5 that is rigidly secured to an arm or bracket 6 which, in practice, will be rigidly secured to a suitable rear portion of the frame or body of the automobile, not shown. The crotch or bend of the U-shaped socket member 1 is made concave at 7, so as to fit one side of the ball 4; and the dog 2, at its free end, is provided with an oblique surface 8 that engages the other side of the pole, and under the weight of said dog, quite tightly presses against the ball, and in turn holds the latter seated in the socket concave 7. This prevents rattling, but at the same time, leaves the pole free for the required vertical and lateral oscillations, in respect to the automobile.

The dog 2 might be yieldingly pressed downward solely by gravity, but is also subject to the downward pressure of a spring 9, as shown, applied around the bolt $2^a$ and re-acting against the upper plate $1^a$ of the socket member 1 and the top of the said dog 2.

Here it should be noted that the top plate $1^a$ of the socket member 1 terminates short of its concave surface 7, so as to leave a large passage 10 through which the upwardly extended end of the said dog 2 works freely.

The lock for positively securing the dog 2 in its operative position engaged with the ball 4, is preferably in the form of a lock lever 11 pivotally connected to the free end of the dog 2 by a pivot pin 12. The free upper end of this lock lever 11 works upwardly through the passage 10, and it is provided with a lock shoulder 13 that engages the front edge of the top wall $a^1$ of the socket member 1 to positively hold the said clamping dog 2 in its working position. A spring 14 coiled around the pivot bolt 12 reacts against the upturned end of the dog 2 and against the lock lever 11 and exerts a force which tends to hold the lock shoulder 13 engaged with the top plate $1^a$, as shown in Fig. 1. Obviously, in the position of the parts shown in Fig. 1, the lock dog 2 is positively held in its operating position but may be easily released simply by pressing forward on the free upper end of the said lock lever 11. As shown, the free end of the lock lever 11 is turned in one direction and the upper extended end of the dog 2 is turned in the opposite direction, so as to afford a good grip for the fingers or fingers and thumb in releasing the lock lever and lifting the lock dog into a raised position, in which raised position it permits the free disengagement of the socket 1 from the ball 4. This positive lock for the clamping dog 2 positively locks the same in engagement with the pole, and the latter in engagement with the concave of the socket, and thus positively prevents accidental separation and opening up of the separable elements of the pole coupler. Such a positive lock is very desirable because a pole coupler applied, for example, to connect a trailer to an automobile, will be subject to very many and intense jars, jolts, and strains, which, under certain conditions, might accidentally open up the coupler.

What we claim is:

1. In a pole coupler, the combination with a ball, of an approximately U-shaped socket member having a socket engaging one side of the said ball, a dog pivoted to said socket member and having a free end portion engageable with the opposite side of said ball, and a spring pressed lock lever pivoted to said dog and engageable with said socket member to hold said dog in an operative position.

2. In a pole coupler, the combination with a ball having a vertically extended stem, of an approximately U-shaped socket member having a socket engaging one side of said ball, a ball clamping dog located between the prongs of said socket member and pivoted thereto, the said dog at its free end having an oblique upwardly extended ball engaging surface, and the said socket member having a top plate terminating short of its ball engaging socket, and a spring pressed lock lever pivoted to the free portion of said dog and having a shoulder engageable with the top flange of said socket member to lock said dog in an operative position.

In testimony whereof we affix our signatures in presence of two witnesses.

MILTON D. BRICE.
ALFRED L. BRICE.

Witnesses:
BERNICE G. WHEELER,
HARRY D. KILGORE.